United States Patent

Reynolds et al.

[11] Patent Number: 6,094,029
[45] Date of Patent: Jul. 25, 2000

[54] INTEGRAL POWER PACK AND RECHARGER

[75] Inventors: Andrew E. Reynolds, Bothell, Wash.; Brian Arthur, Marion, Mass.; Kenneth L. Coffman, Mt. Vernon, Wash.; Thomas P. Dillon, Burlington, Wash.; Claudiu Bulai, Bellevue, Wash.

[73] Assignee: Intermec IP Corporation, Beverly Hills, Calif.

[21] Appl. No.: 09/176,045

[22] Filed: Oct. 20, 1998

[51] Int. Cl.[7] .......................................... H02J 7/02
[52] U.S. Cl. ............................... 320/111; 320/107
[58] Field of Search .................... 320/111, 107, 320/106; 429/96–100

[56] References Cited

U.S. PATENT DOCUMENTS

| | | | |
|---|---|---|---|
| 5,459,389 | 10/1995 | Fujiwara et al. | 320/111 |
| 5,684,689 | 11/1997 | Hahn | 363/146 |
| 5,926,007 | 7/1999 | Okada | 320/132 |

*Primary Examiner*—Peter S. Wong
*Assistant Examiner*—Lawrence Luk
*Attorney, Agent, or Firm*—Perkins Coie LLP

[57] ABSTRACT

A rechargeable power pack comprises a housing, an energy storage device received in the housing, and a set of contacts extending from the housing and electrically coupled to the energy storage device to provide an electrical input current to the energy storage device at a first time and an electrical output current from the energy storage device at a second time. The electrical contacts are preferably formed as a set of prongs sized and dimensioned to be received in a standard electrical outlet. The rechargeable power pack may contain a charging circuit, a discharging circuit, and a switch to selectively couple the charging circuit and the discharging circuit between the contacts and the energy storage device. Additional circuitry may be provided for decoupling the charging circuit when either a voltage, temperature, or time has exceeded some predefined value.

29 Claims, 3 Drawing Sheets

INTEGRAL POWER PACK AND RECHARGER

TECHNICAL FIELD

This invention relates to rechargeable electrical power sources, such as rechargeable power or battery packs for providing electrical power to portable devices, such as hand-held bar code scanners.

BACKGROUND OF THE INVENTION

Many electrical devices rely on batteries as a power source. While having certain drawbacks, the batteries allow the electrical devices to be highly portable. These battery powered devices may be operated where no convenient source of power may be found, or it may be operated free from any encumbering extension cords. Common disposable batteries include, for example, alkaline batteries. One of the significant drawbacks of battery powered devices is the expense of disposable batteries. This drawback has been overcome with the introduction of a variety of rechargeable batteries. Some of the more common rechargeable batteries include nickel cadmium batteries (NiCads), sealed lead-acid batteries and gel type batteries. Recently, manufactures have made use of more exotic technologies, such as nickel hydride and lithium ion, to produce rechargeable batteries having enhanced performance characteristics.

A unitary battery recharger is used to charge spent or drained rechargable batteries. The user removes the drained rechargeable batteries from the electrical device and places the batteries into the battery recharger. The battery recharger often includes a housing, an adapter and an electrical cord connecting the housing and the adapter. The housing may have a number of electrical contacts for holding and forming electrical connections with batteries of various sizes. The adapter includes a set of electrical prongs designed to be accepted in standard electrical outlets, such a the common wall-mounted outlets found in most buildings. The adapter will typically contain all of the circuitry necessary for converting an alternating current (AC), such as the 110 VAC current commonly found in the United States, to an appropriate direct current (DC) for recharging the spent batteries. The battery recharger may contain additional circuitry for controlling the flow of current to the battery, for example, reducing or terminating current flow if the temperature of the battery exceeds a safe operating temperature.

Rechargeable power packs are becoming increasingly common. The power packs often contain multiple battery cells and electrical circuitry that, for example, may indicate a power status for the power pack. The power pack may be easily loaded into an electrical device, and is more convenient than handling multiple batteries. The power packs are recharged in a similar manner to the rechargeable batteries, the spent power pack being inserted into a power pack recharger. Power is typically supplied from a standard wall-mounted outlet, by way of an adapter, similar to the adapter of the battery recharger. The recharger may contain additional electrical circuitry, such as circuitry for controlling the recharging operation.

Current power packs and their recharging systems have a number of disadvantages. A user must gain access to a recharger each time the battery or power pack requires recharging. It may be inconvenient to retrieve the recharger or the recharger may often be misplaced. Consequently, large amounts of time may be lost retrieving or searching for the recharger. Also, rechargers are bulky. When working off site, the bulky recharger must be taken along to recharge the power pack.

SUMMARY OF THE INVENTION

The present invention overcomes some of the limitations described above and provides other distinct advantages by providing a power pack and recharger in an integral package.

In one exemplary embodiment, a rechargeable power pack comprises a housing, an energy storage device received in the housing, and a set of contacts extending from the housing and electrically coupled to the energy storage device to provide an electrical input current to the energy storage device at a first time and an electrical output current from the energy storage device at a second time. The electrical contacts are preferably formed as a set of prongs sized and dimensioned to be received in a standard electrical outlet. The rechargeable power pack may contain a charging circuit, a discharging circuit, and a switch to selectively couple the charging circuit and the discharging circuit between the contacts and the energy storage device. The rechargeable power pack may further contain a converting circuit for transforming an AC current on the contacts to recharge the energy storage device. The rechargable power pack may contain additional circuitry for decoupling the charging circuit or limiting the charging current when some predefined criteria has been reached. For example, charging may be switched from a "fast charge" mode to a "trickle charge" mode when either a voltage, temperature, or time has exceeded some predefined value.

The rechargeable power pack is designed to power an electrical device having an electrical receptacle that includes first and second slots sized to receive the prongs of the rechargeable battery pack. Electrical contacts are formed in each of the slots and are coupled to an electrical circuit in the device. Thus, the rechargeable power pack may be plugged directly into a standard outlet for recharging and then easily loaded into the electrical device for providing power to the device once the power pack has been recharged.

DETAILED DESCRIPTION OF THE INVENTION

In the following description, certain specific details are set forth in order to provide a thorough understanding of various embodiments of the present invention. However, one skilled in the art will understand that the present invention may be practiced without these details. In other instances, well-known structures associated with rechargeable power packs, rectifiers, and other electrical circuits have not been shown in detail to avoid unnecessarily obscuring the description of the embodiments of the invention.

Figure 1:
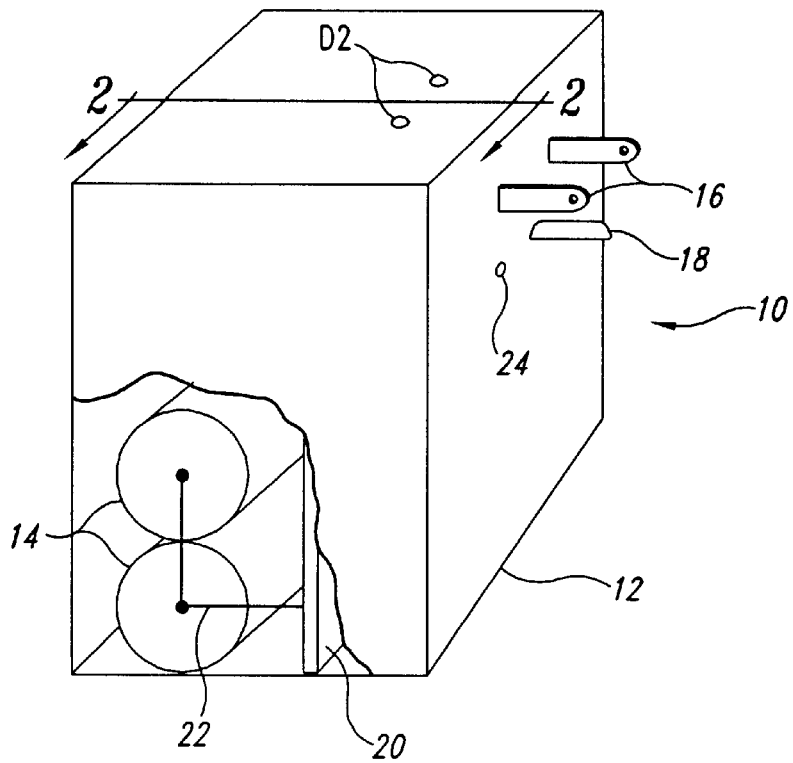
FIG. 1 is an isometric, partial breakaway right rear view of an exemplary embodiment of a rechargeable power pack.

FIG. 1 shows a rechargeable power pack in the form of a rechargeable battery pack 10. The rechargeable battery pack 10 includes a housing 12, an energy storage device in the form of batteries 14, and a set of contacts in the form of prongs 16, 18. The energy storage device may take the form of any device capable of storing energy and delivering it in an electrical form, however batteries 14 are the preferred storage device. Examples of suitable batteries 14 include lithium ion (Li/On), nickel cadmium batteries (NiCad), lead-acid, and gel cells. NiCad and lead-acid batteries are sealed and will not leak so they are suitable for use in electronic equipment. While NiCad and lead-acid batteries both have lower energy content than primary cells, they have the advantage of being rechargeable. Both NiCad and sealed lead-acid batteries are purportedly good for 250–1000 charge/discharge cycles.

The housing 12 may include a circuit-board 20 for carrying electronic components and connections, as will be described in detail below. Electrical leads, such as lead 22, connect the circuit-board 20 to the batteries 14. An aperture 24 formed in the housing provides access to a switch 26 (FIG. 2) for switching between a recharging mode for charging the battery 14 and a discharging mode for providing power from the battery 14 to an electrical device. The housing further includes a pair of light emitting diodes (LEDS) D2 for providing a visual indication of the charging status of the battery 14.

Figure 2:
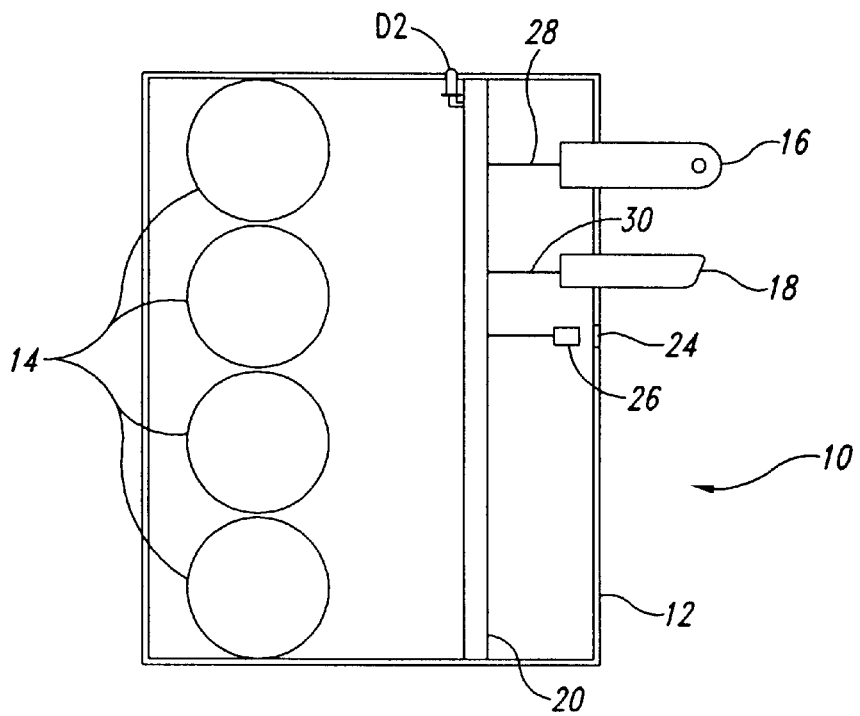
FIG. 2 is a cross-sectional view taken along cross-section line 2—2 of FIG. 1 of the rechargeable power pack.

FIG. 2 shows the rechargeable battery pack 10 including the housing 12, the batteries 14, the prongs 16, 18, and the circuit-board 20. Electrical leads 28, 30 connect the prongs 16, 18, respectively, to the circuit-board 20. FIG. 2 further shows the position of the switch 26 with respect to the aperture 24.

Figure 3:
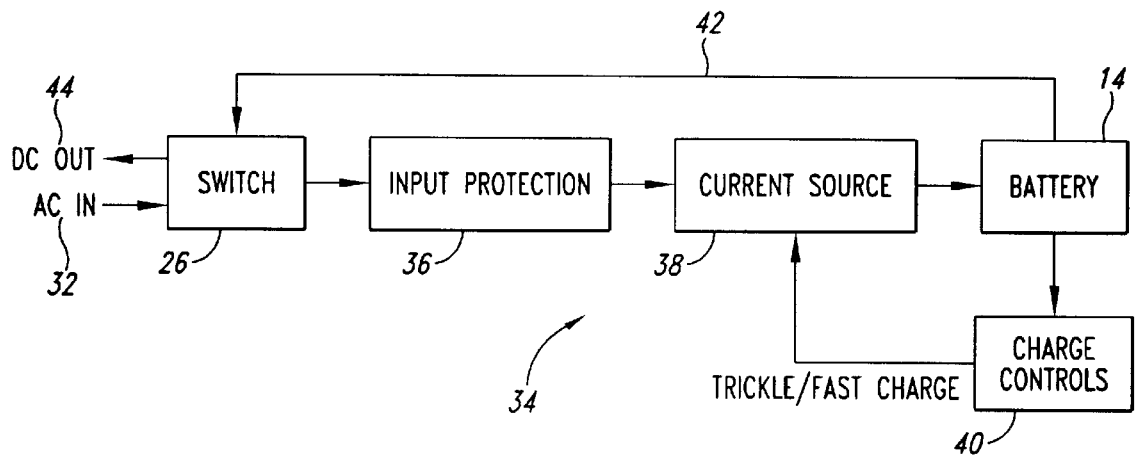
FIG. 3 is a block diagram of the circuit structure of the rechargeable power pack of FIG. 1.

FIG. 3 is a functional block diagram of the rechargeable battery pack 10. In a recharging mode, the switch 26 couples an AC current 32 on the prong 16 to the battery 14 through a charging circuit 34. In a discharging mode, the switch 26 couples the battery 14 to the prongs 16 through a discharging path 42 for providing a DC output current 44 on the prongs 16.

The switch 26 may take the form of a normally open, momentary closed type switch, for being closed by contact with a portion of an electrical device. The rechargeable power pack 10 may employ other suitable electromechanical switches or electrical switches, such as transistors. One skilled in the art will recognize that the rechargeable battery pack may employ a current or voltage sensitive switch 26. The current or voltage sensitive switch would, for example, switch the rechargeable battery pack 10 to the charging mode when an AC voltage is detected across the prongs 16, or to the dis charging mode when a DC voltage is detected across the prongs 16.

The charging circuit 34 includes input protection circuitry 36, a current source 38, and charge controls 40 for controlling the current source 38. The input protection circuitry 36 provides protection for the current source 38, the battery 14 and the charge controls 40 from excessive input currents, voltages and spikes. The current source 38 transforms the AC current 32 into a DC current for charging the battery 14. The charge controls 40 adjust the current source 38 to provide an appropriate DC current to the battery 14 based on a condition of the battery 14, for example switching between a fast charge mode and a trickle charge mode.

Figure 4:
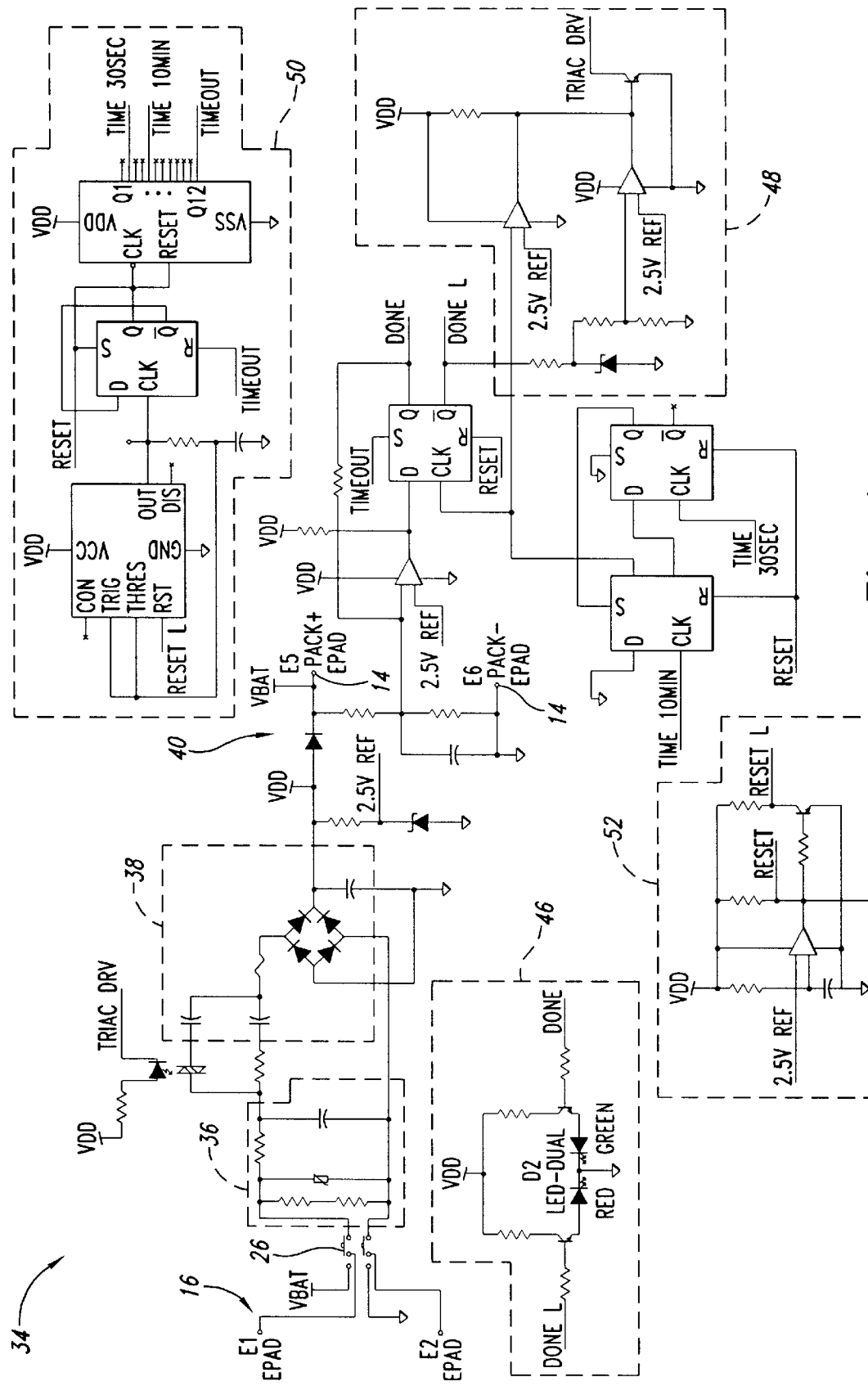
FIG. 4 is a schematic drawing of an exemplary circuit of the rechargeable power pack.

With reference to FIG. 4, an exemplary embodiment of an electrical circuit for the rechargeable battery pack 10 is shown. A pair of electrical leads connect the prongs 16 to one pole of the switch 26. A second pair of electrical leads connect another pole of switch 26 to the charging circuit 34. A third pair of electrical leads connects the remaining pole of the switch 26 to the battery 14 and ground through the discharging circuit 42. The switch 26 is a normally opened momentary close type switch, the open position corresponding to the charging mode for the rechargeable battery pack 10.

The charging circuit 34 includes the input protection circuitry 36 that comprises resistors R2, R3 and R6, coupling capacitor C5, and an input suppressor RV1, all connected as shown in FIG. 4. The input protection circuitry 36 prevents the overloading of the remainder of the charging circuit 34. In an alternative embodiment, an inductor (not shown) may replace the resistor R2.

The charging circuit 34 also contains the current source 38 that comprises capacitors C1, C3 and C6 with a full wave bridge rectifier U2, all connected as shown in FIG. 4. The capacitors C1 and C3 provide voltage and current limits that may be calculated from the formula $I=2\pi(f)(C)(u)$, where f is equal to frequency, C is the capacitance and u is the voltage drop across the capacitors. The current source 38 rectifies the AC current from the prongs 16 to produce a rectified current for charging the battery 14.

The remainder of the circuitry constitutes the charge controls 40. When the rechargeable battery pack 10 is in the charging mode, the charge controls 40 regulate the charging of the battery 14. In the exemplary embodiment, the charge controls 40 select between the fast charge and the trickle charge modes, to control the delivery of current to the battery 14. The selection may be based on a variety of criteria, such as user input, time of charging, or the condition of the battery 14. The condition of the battery 14 may, for example, be determined by either the voltage across the terminals of the battery 14 or the temperature of the battery 14.

The charge controls 40 comprise a supply voltage VDD a protection diode D1, and a Zener regulator formed by a resistor R14 connected to ground through a Zener diode D3 and providing a reference voltage 2.5V REF. The charge controls 40 further comprise a voltage divider comprising a pair of resistors RS, R12, a grounded capacitor C7, an operational amplifier U3D, a pair of resistors R15 and R20 and a clocked flip-flop U5A, all coupled as shown in FIG. 4. The flip-flop U5A produces a pair of control signals DONE and DONE_L, DONE_L being the converse of DONE_REG.

The charge controls 40 may further include status circuitry 46 for providing a visual indication of the charge status of the battery 14 based on the signals DONE and DONE_L produced by the flip-flop U5A. The status circuitry 46 includes red and green LEDs D2 connected to a supply voltage $V_{DD}$ through a pair of resistors R23 and R24 and connected to ground through a pair of bipolar transistors Q2 and Q3, that are each in turn connected at their gates to receive the signals DONE_L and DONE through resistors R25 and R26, respectively.

The rechargeable battery pack 10 may further include a temperature responsive switching circuit 48 as part of the charge controls 40. The temperature responsive switching circuit 48 monitors the temperature of the battery 14 and appropriately adjusts the charging current in response to the temperature as measured on the surface of the battery 14. For example, the temperature responsive switching circuit 48 may switch from the fast charge mode to the trickle charge mode when the temperature of the battery 14 exceeds some predefined threshold level. Alternatively, the temperature responsive switching circuit 48 may terminate battery charging when the threshold temperature is reached. The temperature responsive circuit 48 comprises the a triac having an optically-coupled gate U1, a transistor Q4, a pair of operational amplifiers U3A, U3B, resistors R13, R28, and R31, a voltage divider formed of a thermistor RT and a resistor R30, and a Zener diode D4 providing a voltage reference to the voltage divider, all coupled as shown in FIG. 4. The triac U1 is coupled to the full-wave bridge rectifier U2 for modulating between fast charge and trickle charge modes. For surge protection, the triac U1 may have an extra surge absorber across the anodes.

The charge controls 40 may also include a time responsive switching circuit 50 for appropriately adjusting the charging current in response to the duration of battery charging. For example, the time responsive switching circuit 50 may switch the charging circuit 34 from the fast charge mode to trickle charge mode after some predefined time interval. The time responsive switching circuit 50 comprises a 555 timer chip U4, a resistor R19, a grounded capacitor C9, a flip-flop U5B and a 4040 controller U7. The flip-flop U5B divides a CLOCK signal from the 555 timer chip U4 by two. The time responsive switching circuit 50 provides a timing signal TIMEOUT from the 4040 controller U7 to the clocked flip-flop U5A. The clocked flip-flop U5A generates the DONE and DONE_L signals and provides these control signals to the LEDs D2, to the temperature responsive circuit 48 and to the triac U1.

The charge controls 40 may also include a voltage responsive switching circuit 52 for switching the charging circuit 34 from the fast charge mode to the trickle charge mode after the voltage of battery 14 reaches some preset value. The voltage responsive switching circuit 52 comprises operational amplifier U3C, resistors R16, R17, R18 and R21, capacitor C8 and transistor Q1. The voltage responsive switching circuit 52 provides an output RESET to the clocked flip-flop U5A for starting each measurement cycle.

Figure 5:
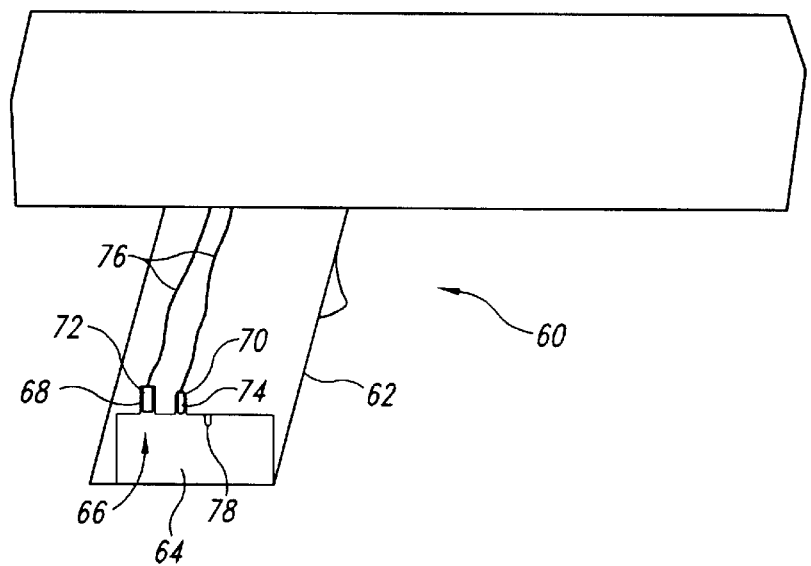
FIG. 5 is a side elevational view of an exemplary electrical device in the form of a symbology reader for use with the rechargeable power pack of FIG. 1.

FIG. 5 shows an electrical device in the form of a symbology reader 60. The handle 62 of reader 60 is shown in cross-section to make clear the physical interaction of the rechargeable battery pack 10 with the reader 60. The handle 62 defines a compartment 64 sized and dimensioned to receive the rechargeable battery pack 10 therein. An electrical receptacle 66 is defined in the compartment 64 and has a pair of apertures such as slots 68 sized and dimensioned to receive the prongs 16 of the rechargeable battery pack 10. The electrical receptacle 66 may also include an aperture 70 for receiving the grounding prong 18 of the rechargeable battery pack 10. Electrical contacts 72 and 74 are formed in the slots 68 and aperture 70 to make electrical contact with the prongs 16, 18. A set of electrical leads 76 extend from the electrical contacts 72, 74 to the circuitry (not shown) in the symbology reader 60. A portion 78 of the handle 62 of the symbology reader 60 is sized and dimensioned to be received in the aperture 24 of the housing 12 of the rechargeable battery pack 10 for physically engaging the switch 26. When the battery pack 10 is installed in the receptacle 64 the switch 26 is activated or closed by the portion 78 to place the battery pack 10 in decharging mode. Upon removal, the portion 78 of the handle 62 disengages from the switch 26 causing the circuitry of the battery pack 10 to be placed in charging mode. Thus, an integral battery pack and recharging device having a single set of electrical prongs sized and dimensioned to be received in standard sized outlets is provided.

Although specific embodiments of and examples for the present invention are described herein for illustrative purposes, various equivalent modifications can be made without departing from the spirit and scope of the invention, as will be recognized by those skilled in the relevant art. The teachings provided herein of the present invention can be applied to other energy storage devices and not necessarily the exemplary rechargeable battery pack generally described above.

These and other changes can be made to the invention in light of the above detailed description. In general, in the following claims, the terms used should not be construed to limit the invention to the specific embodiments disclosed in the specification and the claims, but should be construed to include all energy storage devices and rechargers that operate in accordance with the claims. Accordingly, the invention is not limited by the disclosure, but instead its scope is to be determined entirely by the following claims.

What is claimed is:

1. A rechargeable battery pack comprising:
   a housing;
   a battery received in the housing;
   a set of prongs extending from the housing;
   a charging circuit received in the housing; and
   a switch carried by the housing, the switch selectively coupling the battery to the prongs through the charging circuit at a first time and through a discharging path at a second time.

2. The rechargeable battery pack of claim 1 wherein the set of prongs includes two prongs.

3. The rechargeable battery pack of claim 1 wherein the set of prongs includes three prongs, one of the three prongs serving as a ground terminal.

4. The rechargeable battery pack of claim 1 wherein the charging circuit includes a full-wave bridge rectifier.

5. The rechargeable battery pack of claim 1 wherein a portion of the switch is positioned to be operably contacted by a portion of a battery powered device when the rechargeable battery pack is mounted in the battery powered device.

6. The rechargeable battery pack of claim 1 wherein a portion of the switch is positioned to be operably contacted by a portion of a battery powered device when the rechargeable battery pack is mounted in the battery powered device and to not be operably contacted by an AC power outlet when the rechargeable battery packet is coupled to the AC power outlet.

7. The rechargeable battery pack of claim 1 wherein the switch is mounted in an interior of the housing and is activated by an AC power placed across the set of prongs.

8. The rechargeable battery pack of claim 1, further comprising:
   at least one visual indicator of the battery charge status carried by the housing.

9. The rechargeable battery pack of claim 1, further comprising:
   a set of light emitting diodes carried on the housing, the set of light emitting diodes operably coupled to a charge control circuit for providing a visual indication of the battery charge status.

10. The rechargeable battery pack of claim 1, further comprising:
    a temperature sensitive switching circuit electrically coupled between the battery and the charging circuit to selectively decouple the battery from the charging circuit in response to a temperature of the battery.

11. The rechargeable battery pack of claim 1, further comprising:

a voltage sensitive switching circuit electrically coupled between the battery and the charging circuit to selectively couple and decouple the battery from the charging circuit in response to a voltage of the battery.

12. The rechargeable batter pack of claim 1, further comprising:
   a time sensitive switching circuit electrically coupled between the battery and the charging circuit to selectively couple and decouple the battery from the charging circuit in response to a duration of charging of the battery.

13. A rechargeable power pack comprising:
   a housing;
   an energy storage device received in the housing; and
   a set of electrical prongs adapted to connect to a conventional female AC power supply receptacle extending from the housing and electrically coupled to the energy storage device to provide input power to the energy storage device at a first time and output power from the energy storage device at a second time.

14. The rechargeable power pack of claim 13, further comprising:
   a charging circuit selectively coupled between the prongs and the energy storage device;
   a discharging circuit selectively coupled between the prongs and the energy storage device; and
   a switch to selectively switch the current flow between the charging circuit and the discharging circuit.

15. The rechargeable power pack of claim 14 wherein the charging circuit comprises a first capacitor and a second capacitor coupled in parallel to the first capacitor, the first and the second capacitors selected to achieve a predefined voltage limitation and a predefined current limitation.

16. The rechargeable power pack of claim 13, further comprising:
   a selection circuit received in the housing, the selection circuit including a charging path and a discharging path.

17. The rechargeable power pack of claim 13 wherein the switch is a normally open momentary switch.

18. The rechargeable power pack of claim 13 wherein the energy storage device comprises a rechargeable battery.

19. The rechargeable power pack of claim 13, further comprising:
   a temperature sensitive switching circuit electrically coupled between the energy storage device and the set of prongs to provide a signal in response to a temperature of the battery.

20. The rechargeable power pack of claim 19 wherein the temperature sensitive switching circuit comprises a triac having a surge absorber across a pair of anodes.

21. The rechargeable power pack of claim 13, further comprising:
   a voltage sensitive switching circuit electrically coupled between the energy storage device and the set of prongs to provide a signal in response to a voltage of the battery.

22. The rechargeable power pack of claim 13, further comprising:
   a time sensitive switching circuit electrically coupled between the energy storage device and the set of prongs to provide a signal in response to a duration of charging of the battery.

23. The rechargeable power pack of claim 13, further comprising:

a temperature sensitive switching circuit electrically coupled between the energy storage device and the set of prongs to provide a first signal in response to a temperature of the battery;
a voltage sensitive switching circuit electrically coupled between the energy storage device and the set of prongs to provide a second signal in response to a voltage of the battery; and
a time sensitive switching circuit electrically coupled between the energy storage device and the set of prongs to provide a third signal in response to a duration of charging of the battery.

24. A rechargeable battery pack, comprising:
   a single housing;
   a rechargeable battery received in the housing; and
   a single set of prongs extending from the housing and electrically coupled to the battery to provide an electrical charging current to the battery at a first time and an electrical discharging current from the battery at a second time, the set of prongs being sized and dimensioned to be received in a standard AC power outlet.

25. The rechargeable battery pack of claim 24, further comprising:
   a switch carried by the housing, the switch selectively coupling the battery to the prongs through a charging circuit at the first time and through a discharging circuit at the second time.

26. The rechargeable battery pack of claim 24 further comprising:
   a switch carried by the housing, the switch selectively coupling the battery to the prongs through a charging circuit including a rectifier at the first time and through a discharging circuit at the second time.

27. A electrical device, comprising:
   a body having
   an electrical receptacle coupled thereto; and
   an electrical circuit defined therein;
   wherein the electrical receptacle includes a first aperture and a second aperture, the first aperture and second aperture sized to receive a first prong and a second prong respectively of a rechargeable battery pack where the first and the second prongs are shaped, dimensioned and positioned relative to each other to be removably received in a standard electrical outlet, the first aperture and the second aperture each having an electrical contact formed therein, the electrical contacts being electrically coupled to the electrical circuit for providing power thereto from the rechargeable battery pack.

28. The electrical device of claim 27, further comprising:
   a battery pack removably mountable to the body for providing power to the electrical circuit, the battery pack comprising a housing, a battery received in the housing, a set of prongs extending from the housing, a charging circuit, a discharging circuit and a switch for selectively coupling the set of prongs to the battery through one of the charging circuit and the discharging circuit.

29. The electrical device of claim 27, wherein the electrical receptacle has a third slot defined therein, the third slot sized to receive a grounding prong of a rechargeable battery pack.

* * * * *

UNITED STATES PATENT AND TRADEMARK OFFICE
CERTIFICATE OF CORRECTION

PATENT NO. : 6,094,029
DATED : July 25, 2000
INVENTOR(S) : Andrew E. Reynolds et al.

It is certified that error appears in the above-identified patent and that said Letters Patent is hereby corrected as shown below:

Column 7,
Line 5, "batter" should be -- battery --.

Signed and Sealed this

Nineteenth Day of October, 2004

JON W. DUDAS
*Director of the United States Patent and Trademark Office*